United States Patent
Marchi

(10) Patent No.: US 8,210,338 B2
(45) Date of Patent: Jul. 3, 2012

(54) APPARATUS AND METHOD FOR ORIENTING OBJECTS

(75) Inventor: Paolo Marchi, Imola (IT)

(73) Assignee: Sacmi Cooperativa Meccanici Imola Societa' Cooperativa (IT)

( * ) Notice: Subject to any disclaimer, the term of this patent is extended or adjusted under 35 U.S.C. 154(b) by 210 days.

(21) Appl. No.: 12/632,142

(22) Filed: Dec. 7, 2009

(65) Prior Publication Data

US 2010/0155195 A1   Jun. 24, 2010

(30) Foreign Application Priority Data

Dec. 15, 2008 (IT) .............................. MO2008A0323

(51) Int. Cl.
 *B65G 47/24* (2006.01)
(52) U.S. Cl. ........................................ 198/383; 198/416
(58) Field of Classification Search ............. 198/377.01, 198/377.02, 377.07, 382, 383, 394, 416
See application file for complete search history.

(56) References Cited

U.S. PATENT DOCUMENTS

| | | | | |
|---|---|---|---|---|
| 1,416,763 A * | 5/1922 | Thom | ........................... | 198/445 |
| 2,609,912 A * | 9/1952 | Engel | ...................... | 198/397.06 |
| 3,306,425 A * | 2/1967 | Bodnar et al. | ................ | 198/399 |
| 4,735,343 A | 4/1988 | Herzog | | |
| 5,038,914 A * | 8/1991 | Cotic et al. | .................... | 198/393 |
| 6,283,272 B1 * | 9/2001 | Hsieh | ........................... | 198/394 |
| 7,228,955 B2 * | 6/2007 | Comas Corral | ............... | 198/527 |
| 7,597,189 B2 * | 10/2009 | Hinsley et al. | ............. | 198/690.2 |
| 7,850,403 B2 * | 12/2010 | Lorange et al. | ................. | 406/79 |

FOREIGN PATENT DOCUMENTS

| | | |
|---|---|---|
| DE | 2365779 A1 | 5/1976 |
| WO | 2008041172 A1 | 4/2008 |

* cited by examiner

*Primary Examiner* — Douglas Hess
(74) *Attorney, Agent, or Firm* — Laubscher & Laubscher, P.C.

(57) ABSTRACT

An apparatus for orienting objects in a preset direction, in particular objects that have a cavity having an opening at one of the ends of the objects, comprises a conveying device for the objects comprising a conveying surface tilted by an angle with respect to a horizontal plane, on the conveying surface there are arranged hooking elements that are suitable for interacting with the cavities, the conveying surface being movable in an advancing direction oriented from a lower end of the conveying device to an upper end of the conveying device.

A method for orienting objects in a preset direction, in particular objects that have a cavity having an opening at one of the ends of the objects, comprises the following steps:

sending the objects, arranged loosely, on a conveying surface tilted by an angle with respect to a horizontal plane, movable in a direction oriented from bottom to top and provided with hooking elements that are suitable for interacting with the cavities when the objects reach the conveying surface with the opening facing the conveying surface;

subjecting the objects having the opening oriented towards said conveying surface to an overturning action to orient the objects with the opening facing a direction opposite the conveying surface.

19 Claims, 3 Drawing Sheets

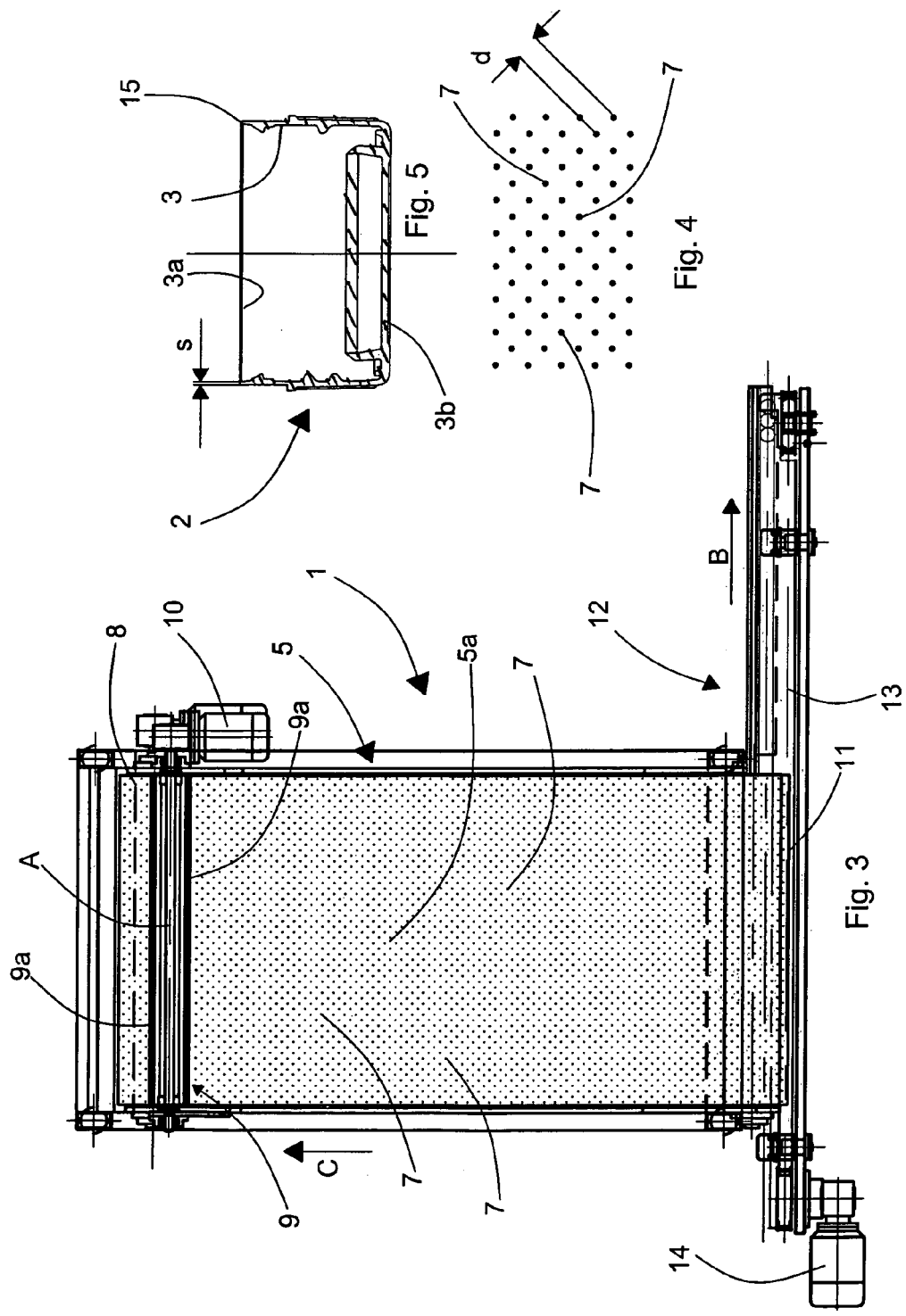

APPARATUS AND METHOD FOR ORIENTING OBJECTS

CROSS REFERENCE TO RELATED APPLICATION

This application is a new U.S. utility application claiming priority benefit of IT MO2008A000323, filed Dec. 15, 2008, the entire contents of which are hereby incorporated by reference.

The present invention relates to an apparatus and a method for orienting objects in a preset direction, in particular objects that have a cavity open at one end thereof, such as, for example, caps for closing bottles.

BACKGROUND OF THE INVENTION

From WO2008/041172 an apparatus is known for orienting objects provided with an open cavity, in particular caps for bottles that comprises a band conveyor by means of which the objects are conveyed as far as a series of brushes that rotate in the same direction, having a rotation axis aligned on the advancing direction of the band conveyor. Between each pair of adjacent brushes there exists a gap, the width of which is selected in such a manner that it is less than the height of the caps. The caps coming from the band conveyor with random orienting fall on the rotating brushes and, if the cavity thereof is oriented towards the surface of the brushes, the bristles of the latter penetrate said cavity and drag the cap, making it pass, also owing to the flexibility thereof, into the gap between two adjacent brushes and sending the cap to an unloading zone underneath. If the cavity of the caps is not oriented towards the surface of the brushes, the bristles of the latter slide on the surface of the caps that thus remain "floating" on the surface of the bristles, not being able to pass into the gap, which has a width that is less than the height thereof, until the motion of the brushes or a collision with other caps orients the caps with the cavity facing the surface of the brushes.

In this apparatus adjusting the width of the gap between pairs of adjacent brushes is critical. In fact, this width, as said, must be chosen so as to prevent incorrectly oriented caps being able to pass into the gap, whilst correctly oriented caps that are caught by the brushes have to be able to pass owing to the flexibility of the bristles. Incorrect adjustment of the width of the gaps between adjacent brushes may compromise correct operation of the apparatus, making the passage into the gaps between the rollers of the correctly oriented caps difficult or making also the passage of non-correctly oriented caps possible.

Further, the productivity of the apparatus is not particularly high, because non correctly oriented caps may remain "floating" on the brushes for a relatively long time, before assuming a correct orientation that enables the passage into the gaps between the brushes and the dispatch to the unloading zone of the apparatus.

The object of the present invention is to provide an apparatus for orienting objects that has an open cavity at one of the ends thereof, that does not require critical adjustments and permits high productivity.

According to a first aspect of the invention an apparatus and method are provided for orienting objects.

The apparatus and the method according to the invention enable objects to be oriented reliably and with great productivity that have an open cavity at an end thereof, for example caps for closing bottles or containers.

BRIEF DESCRIPTION OF THE DRAWINGS

The invention can be better understood and implemented with reference to the attached drawings that show an embodiment thereof by way of non-limiting example, in which:

FIG. 3 is a top view of the apparatus in FIG. 1;

FIG. 4 is an enlarged detail of the apparatus in FIG. 1;

FIG. 5 is a sectional view of an object suitable for being oriented by the apparatus according to the invention;

DESCRIPTION OF THE INVENTION

Figure 1:
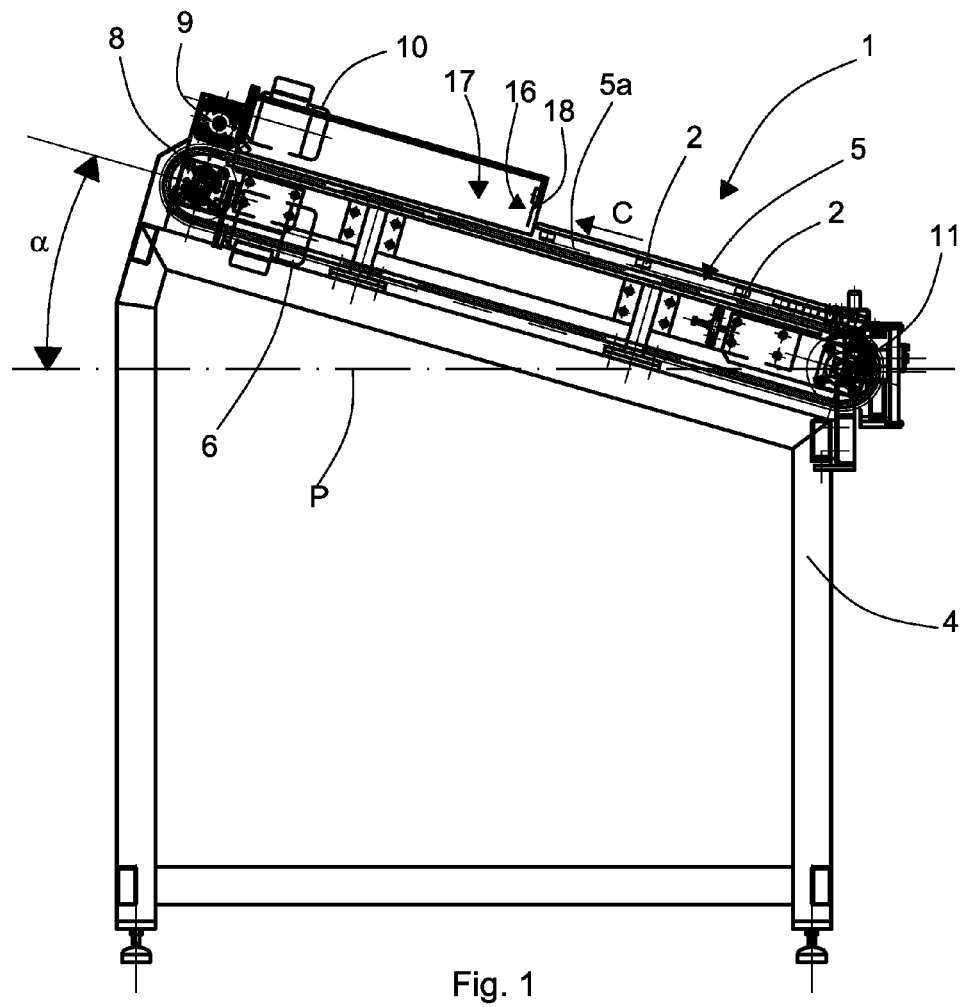
FIG. 1 is an elevation view of an apparatus according to the invention.
Figure 2:
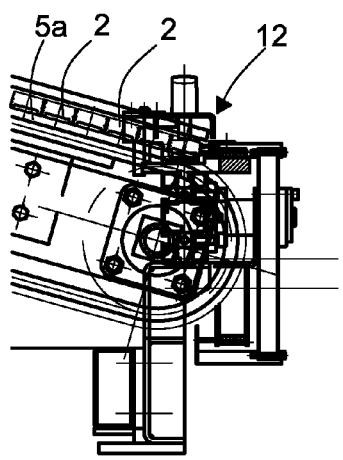
FIG. 2 is an enlarged detail of the apparatus for evacuating the oriented objects in FIG. 1.
Figure 6:
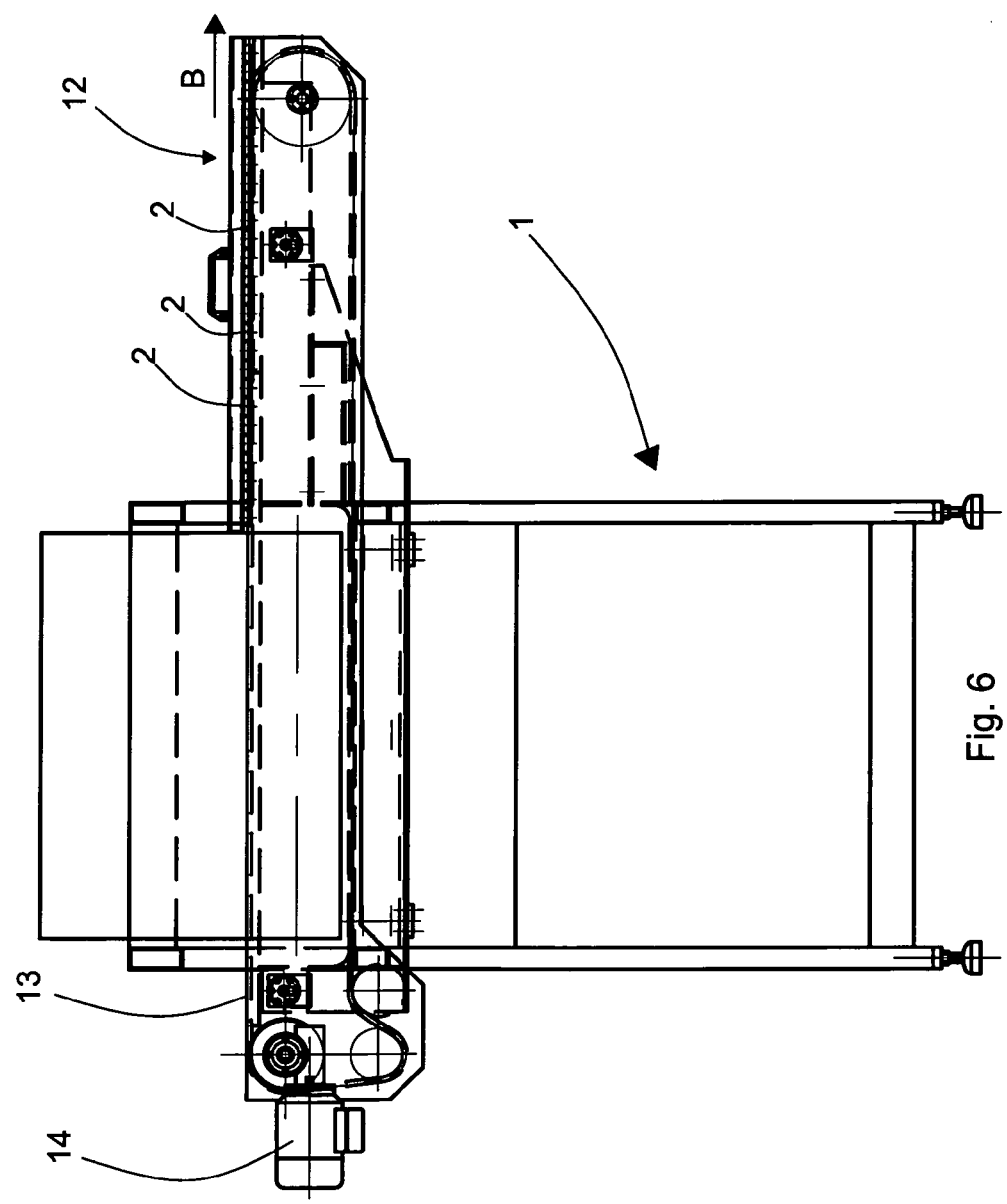
FIG. 6 is a right-hand view of FIG. 1.

An apparatus 1 according to the invention is intended for orienting in a preset direction the objects 2 (FIG. 5) that have a cavity 3 having, at one end of the object 2, an opening 3a that places the cavity 3 in communication with the outside of the object 2, and a substantially flat surface 3b opposite said opening 3a, for example bottle-closing caps or containers. The objects 2 can have a cylindrical shape with a circular or elliptical section, a frustoconical or prismatic shape. The point of gravity of the objects 2 is such as to promote the orienting thereof with the opening 3a of the cavity 3 facing upwards. The apparatus 1 according to the invention comprises a supporting frame 4 on which is mounted a conveying device 5, for example a band conveyor, driven by a first reduction gear 6. The conveying device 5 has a conveying surface 5a tilted by an angle a with respect to a horizontal plane P and is moved in such a manner that the conveying surface 5a slides from the bottom to the top.

The angle of tilt a is comprised, for example, between approximately 10° and approximately 20°, but can assume values that are also greater than 20°.

The conveying surface 5a of the conveying device 5 is provided with a plurality of flexible elements 7, protruding therefrom, for example groups of bristles 7 that are distributed in a substantially uniform manner over the entire conveying surface 5a. The minimum distance d between each flexible element 7 and the flexible elements 7 that are adjacent thereto is greater than the thickness s of the edge 14 of the cavity 3 of each object 2, so as to enable the flexible elements 7 to penetrate said cavity 3 and interact with the internal walls of the cavity 3.

Near the upper end 8 of the conveying surface 5a a rotating cylindrical element 9 is arranged that has a rotation axis A that is parallel to the conveying surface 5a and perpendicular to the motion direction of the conveying device 5. The cylindrical element 9 is rotated around said rotation axis A by a second reduction gear 10. The cylindrical element 9 is provided, on the external surface of further flexible protruding elements 9a that are similar to the flexible protruding elements 7 of the conveying surface 5a, for example groups of bristles. The maximum distance between further adjacent flexible protruding elements 9a that are distributed on the surface of the cylindrical element 9 is chosen sufficiently small to prevent the latter from penetrating inside the cavity 3 of the objects 2, i.e., for example, less than the thickness s of the edge 15 of the cavity 3, such that the objects 2 cannot be, for example, contacted by the cylindrical element 9 and pushed beyond the upper end 8 of the conveying device 5. The rotation direction of the cylindrical element 9 is chosen in such a way that the tangential speed thereof is in an opposite direction to the advancing speed of the conveying surface 5a of the conveying device 5. The distance of the cylindrical element 9 from the conveying surface 5a is chosen so as not to enable the objects 2 to move below the cylindrical element 9 and fall from the upper end 8 of the conveying device 5.

At the lower end 11 of the conveying device 5 there is arranged an evacuating device 12. The evacuating device 12 may comprise, for example, a further band conveyor 13 that receives the uniformly oriented objects 2 coming from the conveying device 5, moves the objects 2 away from the conveying device 5, for example in a direction B that is perpendicular to the flat advancing direction of the conveying surface 5, and conveys the objects 2 to a storage and subsequent processing zone. Alternatively, the evacuating device 12 may comprise a belt conveyor. The evacuating device 12 is driven by a third reduction gear 14.

In an intermediate position between the lower end 11 of the conveying device 5 and the zone 17 of the conveying device 5 in which the objects 2 to be oriented are fed, there is arranged, transversely to the conveying surface 5a, a leveling element 16, which may consist of a series of flexible elements 18 arranged in a rectilinear configuration, for example a rectilinear brush. The lower end of the leveling element 16 is arranged at an adjustable distance from the conveying surface 5a that is slightly greater than the minimum dimension of the objects 2. The function of the leveling element 16 is to prevent an object falling on the conveying surface 5a superimposed on other correctly oriented objects found on said conveying surface 5a, reaching the evacuating device 12. In fact, an object 2 superimposed on another object 2 present on the conveying surface 5a, when it comes into contact with the leveling element 16 is dropped from the latter onto the conveying surface 5a.

The operation of the apparatus 1 according to the invention is as follows. The objects 2 to be oriented are dropped loose onto the conveying surface 5a of the conveying device 5, for example by a feeding hopper that is not shown. The objects 2 that by falling on the conveying surface 5a are oriented by resting on said surface with the surface 3b thereof opposite the opening 3a drop by gravity onto the ends of the flexible elements 7 owing to very low friction resistance between the ends of the flexible elements 7 and said surface 3b, and reach the evacuating device 12 resting thereupon with said surface 3b and with the opening 3a of the cavity 3 facing upwards.

If, on the other hand, an object 2 falls on the conveying device 5 with the opening 3a facing the conveying surface 5a, flexible elements 7 penetrate inside the cavity 3 and, by interacting with the internal surface of the cavity 3, act as dragging elements that drag the objects 2 to the advancing direction of the conveying device 5 until the objects 2 come into contact with the cylindrical element 9. As the speed of the cylindrical element 9 is opposite the advancing speed of the conveying device 5, when an object 2 comes into contact with the further flexible elements 9a arranged on the surface of the cylindrical element 9 the latter exerts a direct thrust thereupon that is directed at promoting the overturning of the object 2. If said overturning occurs, the object 2 rests with said surface 3b on the conveying surface 5a, i.e. oriented with said opening 3a in a direction opposite the conveying surface 5a, and can slide through gravity towards the lower end 11 of the conveying device 5 and reach the evacuating device 12. If said overturning does not occur, the object 2 will continue to interact with the cylindrical element 9 until it is overturned.

All the objects 2 that reach the evacuating device 12 are thus oriented in an identical manner, with the opening 3a of the cavity 3 facing upwards.

The uniform orienting of the objects 2 occurs very rapidly and without errors, owing to the action of the cylindrical element 9 on the objects 2 that fall on the conveying device 5 with incorrect orienting. The productivity of the device 1 according to the invention is therefore high. Further, there is no risk that objects 2 can reach the evacuating device 11 incorrectly oriented, and it is excluded that objects 2 can fall from the upper end of the conveying device 5, passing below the cylindrical element 9.

The invention claimed is:

1. Apparatus for orienting objects in a preset direction, in particular, objects that have a cavity having an opening at one of the ends of said objects, wherein said apparatus comprises a conveying device for said objects comprising a conveying surface tilted by an angle with respect to a horizontal plane, said conveying surface being movable in an advancing direction oriented from a lower end of said conveying device to an upper end of said conveying device, an evacuating device suitable for receiving said objects from said conveying device and for removing said objects from said apparatus, said evacuating device being arranged at a lower end of said conveying device, on said conveying surface there being arranged hooking elements that are suitable for interacting with said cavity when said objects are not oriented in said preset direction so as to drag said objects in said advancing direction and are suitable for not hindering a gravity sliding motion of said objects toward said evacuating device when said objects are oriented in said preset direction.

2. Apparatus according to claim 1, wherein said preset direction is a direction in which said opening is oriented in a direction opposite said conveying surface.

3. Apparatus according to claim 1, further comprising a rotating cylindrical element arranged near said upper end, said rotating cylindrical element being provided on a surface thereof with further hooking elements that are suitable for interacting with said objects.

4. Apparatus according to claim 3, wherein said rotating cylindrical element has a rotation axis substantially parallel to said conveying surface.

5. Apparatus according to claim 4, wherein said rotation axis is substantially perpendicular to said advancing direction.

6. Apparatus according to claim 3, wherein a tangential speed of said cylindrical element is opposite said advancing direction of said conveying surface.

7. Apparatus according to claim 3, wherein said further hooking elements comprise further flexible elements protruding from said surface of said cylindrical element.

8. Apparatus according to claim 7, wherein said further flexible protruding elements comprise groups of bristles.

9. Apparatus according to claim 7, wherein a maximum distance between further hooking elements that are adjacent to one another is less than a thickness of an edge of said cavity.

10. Apparatus according to claim 1 wherein said hooking elements comprise flexible elements protruding from said conveying surface.

11. Apparatus according to claim 10, wherein said flexible protruding elements comprise groups of bristles.

12. Apparatus according to claim 10, wherein a minimum distance between flexible protruding elements that are adjacent to one another is greater than a thickness of an edge of said cavity.

13. Apparatus according to claim 1, wherein said evacuating device comprises a band conveyor.

14. Apparatus according to claim 1, wherein said evacuating device comprises a belt conveyor.

15. Apparatus according to claim 1, wherein said evacuating device is movable in a direction that is perpendicular to said advancing direction.

16. Apparatus according to claim 1, further comprising a levelling element arranged in an intermediate position between said lower end and said conveying device and a zone of said conveying device in which said objects to be orientated are fed, said levelling element being arranged transversely to said conveying surface.

17. Apparatus according to claim 16, wherein said levelling element comprises a plurality of flexible elements arranged in a rectilinear configuration.

18. Apparatus according to claim 16, wherein a lower end of said levelling element is located at a distance from said conveying surface that is slightly greater than a minimum dimension of said objects.

19. Method for orienting objects in a preset direction, in particular, objects having a substantially cylindrical shape, that have a cavity having an opening at one of the ends of said objects, wherein said method comprises the following steps:

sending said objects, arranged loosely, on a conveying surface tilted by an angle with respect to a horizontal plane, said conveying surface being movable in a direction that is oriented from bottom to top and being provided with hooking elements that are suitable for interacting with said cavity, for conveying said objects when said objects reach said conveying surface with said opening facing said conveying surface, and suitable for not hindering a gravity sliding motion downwards of objects that reach said conveying surface with said opening oriented in a direction opposite said conveying surface;

subjecting said objects having said opening oriented towards said conveying surface to an overturning action to orient said objects with said opening facing a direction opposite said conveying surface.

* * * * *